United States Patent [19]

Müller et al.

[11] Patent Number: 4,906,163
[45] Date of Patent: Mar. 6, 1990

[54] STACKING MACHINE FOR MAKING A PLURALITY OF STACKS OF DISK-LIKE WORKPIECES, ESPECIALLY CAN COVERS

[75] Inventors: Jürgen Müller; Eberhard Halle, both of Braunschweig, Fed. Rep. of Germany

[73] Assignees: Schmalbach-Lubeca AG; Eberhard Halle, both of Braunschweig, Fed. Rep. of Germany

[21] Appl. No.: 321,275

[22] Filed: Mar. 9, 1989

[30] Foreign Application Priority Data

Mar. 9, 1988 [DE] Fed. Rep. of Germany ....... 3807693

[51] Int. Cl.$^4$ .............................................. B65G 47/26
[52] U.S. Cl. ............................... 414/789.5; 414/798.2
[58] Field of Search ............... 414/789.5, 798.2, 798.6, 414/798.7, 798.9; 53/501, 542

[56] References Cited

U.S. PATENT DOCUMENTS 4,610,346 9/1986 Phillipson ......................... 414/798.9
4,723,883 2/1988 Smith ................................ 414/798.2

FOREIGN PATENT DOCUMENTS 2244681 3/1973 Fed. Rep. of Germany ...... 414/330

Primary Examiner—Joseph F. Peters, Jr.
Assistant Examiner—Edwin L. Swinehart
Attorney, Agent, or Firm—Herbert Dubno

[57] ABSTRACT

The stacking machine for making stacks of adjacent disk-like workpieces, e.g. metal covers, has a conveyor trough along which a column of workpieces being divided into stacks moves in its longitudinal direction until the stacks reach an unloading station. To maintain a space between successive stacks spherical spacers are inserted between the stacks into a gap formed there by the feed mechanism. A return trough inclined to the conveyor trough running from the unloading station to the feed mechanism is provided for feed back of the spherical spacers. This return trough may be mounted beside or below the conveyor trough. Only a very minimal construction expense is necessary to maintain the gap between the stacks and to feed back the spherical spacers which is effected because of the action of gravity alone.

12 Claims, 4 Drawing Sheets

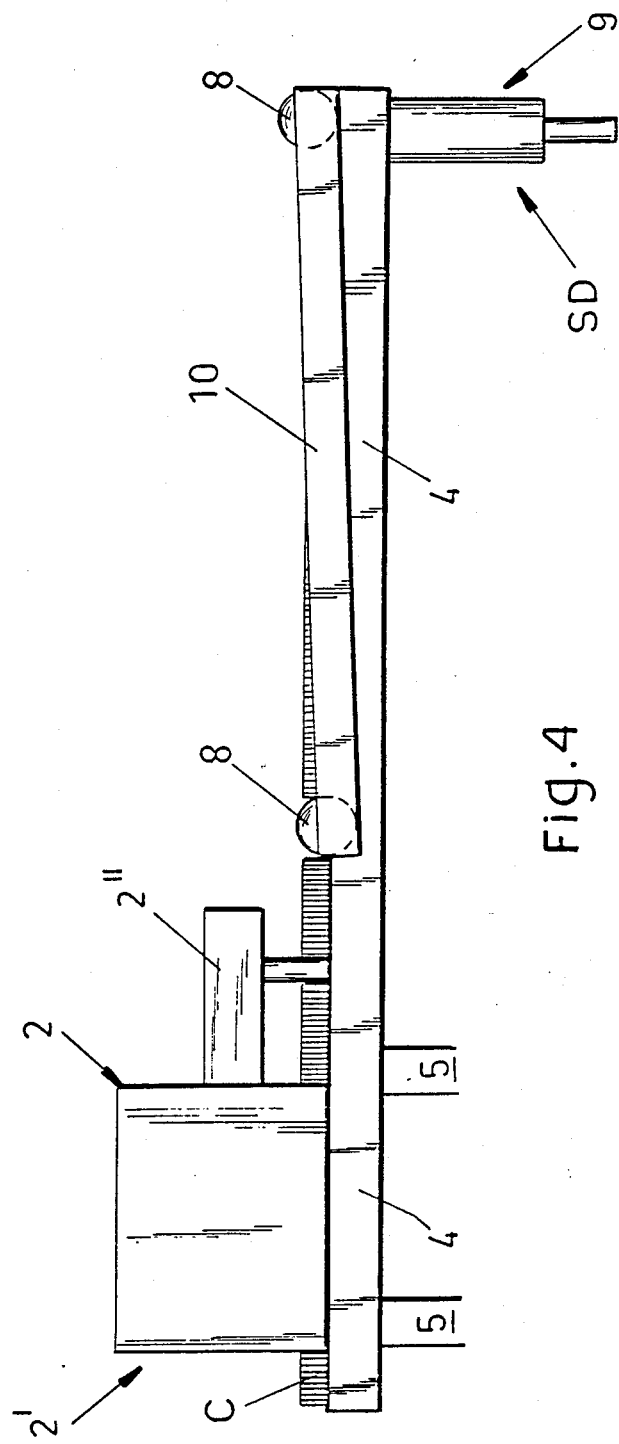

STACKING MACHINE FOR MAKING A PLURALITY OF STACKS OF DISK-LIKE WORKPIECES, ESPECIALLY CAN COVERS

FIELD OF THE INVENTION

Our present invention relates to a stacking machine for making stacks of disk-like workpieces, particularly as a step in packaging stacks of can covers, and especially to a conveyor mechanism for those stacks.

BACKGROUND OF THE INVENTION

A stacking machine for making a stack or stacks of adjacent disk-like workpieces, especially metal covers, can comprise a conveyor trough, on which the workpieces move in a column in the longitudinal direction of the column. The successive stacks are separated by a feed mechanism forming a gap between each of the stacks and the following workpieces and the stacks are further conveyed until they arrive at an unloading station.

A stacking machine is often required as a part of a manufacturing operation for metal covers for food cans and/or beverage cans, which is a part of a longer production line. It has a feed mechanism and a counting mechanism for the covers. It may form stacks which have the same number of covers in each stack. Subsequently each stack may be provided with a jacket and/or label in a packing machine.

The division of a single column of workpieces into the individual stacks and their conveying in the conveyor trough may also be required for processing of the workpieces, e.g. can covers, so that a certain predetermined number of workpieces is fed for further processing.

To help keep the stacks separate in further processing on this conveyor trough, they may be exposed to the action of a feed mechanism guided or located along the conveyor trough.

OBJECTS OF THE INVENTION

It is an object of our invention to provide a stacking machine for making a stack of workpieces as described above with a mechanism for maintaining the gap between successive stacks as they are formed for further processing which does not require a mechanical drive which consumes energy.

It is also an object of our invention to provide a conveyor mechanism for a stacking machine for a stack of disk-like workpieces, i.e. can covers, with a spacer inserting device for maintaining the gap between the successive stacks for further processing, which is easy to construct and has minimal maintenance requirements.

Summary of the Invention

According to our invention a plurality of spherical spacers are provided, each of which functions as a separating member between successive stacks. The conveyor trough is equipped in the vicinity of the feed mechanism with a spacer inserting device for insertion of a spherical spacer in the gap between the successive stacks produced by the feed mechanism and a return trough for the spherical spacers inclined to the conveyor trough extending to the position where the spherical spacers are fed back to the conveyor trough.

A device for insertion of spacers between stacks of covers has been previously described, however only in an unpublished document in connection with a machine for wrapping stacks of covers. This spacer insertion device however is designed for cylindrical spacers, which must be fed by a connecting shaft or duct and a piston-cylinder unit in it into a tubular duct running parallel to the conveyor trough. These cylindrical spacers between the stacks are moved smoothly along the conveyor trough and require, because of their shape, a large applied force to overcome the friction between them and the conveyor trough. Furthermore increased wear occurs in the conveyor trough because of the cylindrical spacers.

In contrast to these disadvantageous aspects of the prior art mechanism the spherical spacers inserted between the stacks move easily in the conveyor trough without a machine-produced moving force. No energy-consuming mechanical drive is required for the return of these spherical spacers, because they arrive back at the place where they are inserted in the column of workpieces because of the force of gravity acting on them and because of the inclined orientation of the return trough.

Furthermore because of the minimal rolling resistance the spherical spacers experience the inclination of the return trough can be very small. The return trough may be open on top so that the motion path of the spherical spacers is easily observable and occasional blockages or disturbances can be immediately detected.

The diameter of the spherical spacers is chosen so that it is less than the diameter of the workpiece covers but may exceed their radius.

To overcome the height difference between the return trough at the unloading station or at the place where the spacers are inserted and the conveyor trough a spacer displacing mechanism (or raising device) for the spherical spacers is provided between the return trough and the conveyor trough. Several variations in specific structure are possible within the scope of our invention. This spacer displacing mechanism can be provided either at the unloading station for the stacks or at the place of insertion of the spherical spacers in the conveyor trough according to what the height of the return trough and the location of the place of insertion of the spherical spacers is in relation to the conveyor trough.

The return trough can be attached laterally to the conveyor trough or under the conveyor trough so that the region above the conveyor trough and/or the stacks located on the conveyor trough remains free for the insertion mechanism on one side and the unloading mechanism on the other side. In one embodiment in which the return trough is laterally attached the return and the conveyor trough at the unloading station are substantially at the same level and the return trough is lower at the place of insertion of the spherical spacers so that the spacer displacing mechanism is required there. However in another embodiment the return trough is higher at the conveyor trough at the unloading station so that the spacer displacing mechanism is required there to lift the spherical spacers.

Preferably the return trough is laterally attached to the conveyor trough and the conveyor trough and the return trough are connected with and open to each other in the vicinity of the unloading station for the stacks for transfer of the spherical spacers and when the return trough running inclined to the place of insertion for the spherical spacers is connected with a feed shaft, which is located under a bottom opening in the conveyor trough and receives the spacer displacing mechanism.

Both the return trough and also the feed shaft in the above-embodiments are supported by the conveyor trough. The feed shaft has a suitably inclined intermediate piece, with which the shaft section provided perpendicular under the bottom opening is connected with the return trough.

In one embodiment the spacer inserting device has a piston-cylinder device or unit which is connected with a displacing member guided in the feed shaft.

The displacing member or spacer displacing mechanism is controllable by the feed mechanism so that it is operable according to the state of the feed mechanism.

Instead of feeding the spherical spacers at the place of insertion through the bottom opening of the conveyor trough the feed of the spherical spacers in the conveyor trough can be provided from the sides. With this arrangement however the return trough may begin laterally above the conveyor trough in the vicinity of the unloading station and may transfer the spherical spacers into the return trough at the unloading station by a spacer inserting device. The mechanism for insertion of the spherical spacers in the conveyor trough can in this case comprise a suitable trough section, if necessary also with a closure member operable by the feed mechanism.

BRIEF DESCRIPTION OF THE DRAWING

The above and other objects, features and advantages of our invention will become more readily apparent from the following description, reference being made to the accompanying highly diagrammatic drawing in which:

FIG. 4 is a side elevational view of an additional embodiment of the stacking machine according to our invention.

SPECIFIC DESCRIPTION

Figure 1:
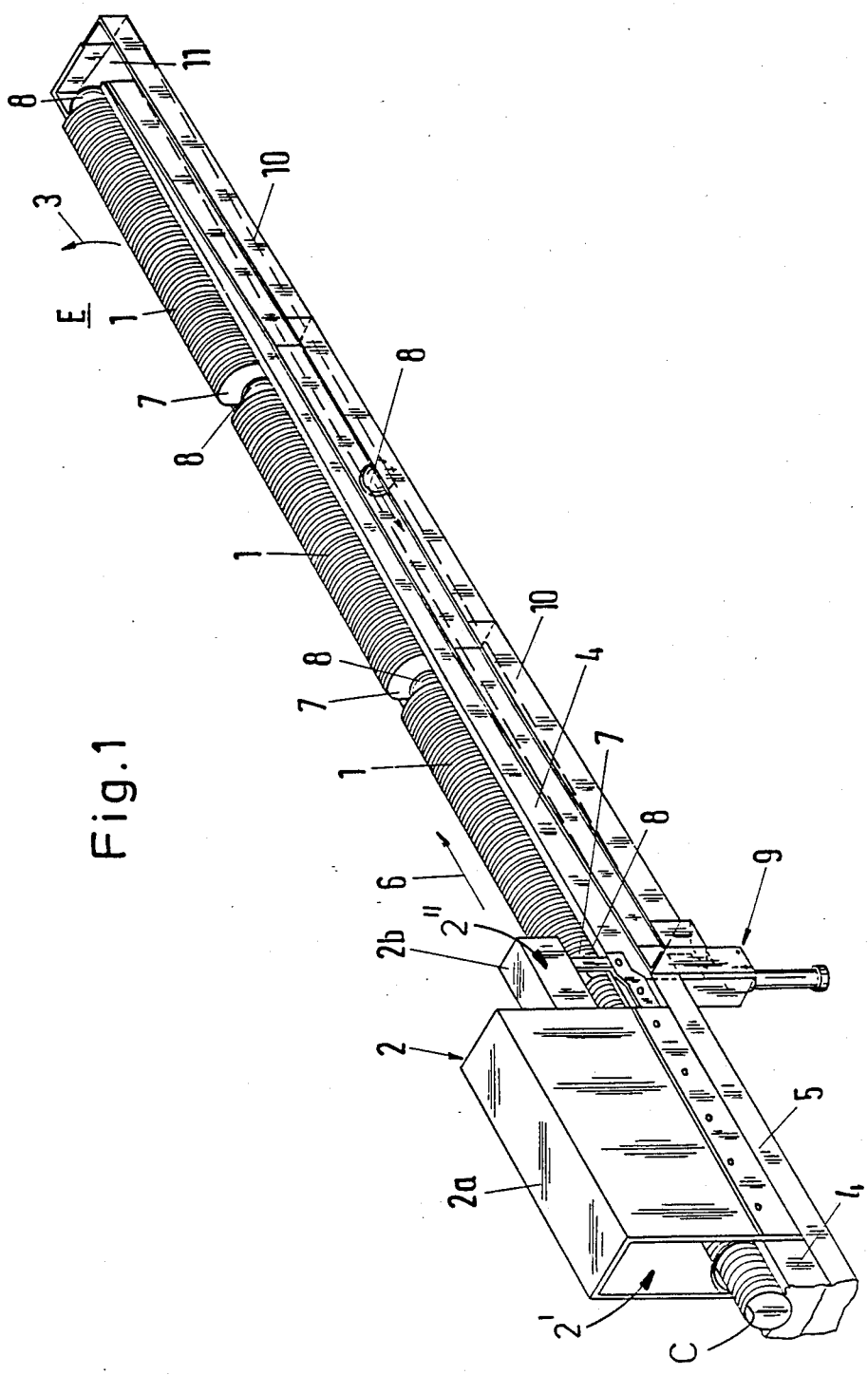
FIG. 1 is a perspective view of a stacking machine for making a stack of disk-like workpieces according to our invention.

In FIG. 1 a portion of the stacking machine for making cylindrical stacks 1 of disk-like workpieces, e.g. can covers, is shown. The stacks 1 are located between a counting and feed mechanism 2 and an unloading station E. The direction in which a stack 1 is removed from the unloading station E is indicated with the arrow 3 in FIG. 1. The unloading is accomplished with the help of gripping mechanisms which are not part of our invention and thus are not reproduced here.

The stacking machine shown comprises a conveyor trough 4, which is mounted on a support 5 in this example, which rests on a base in a way which has not been shown.

The cross section of the conveyor trough 4 is fit to the workpiece stacks 1 and/or the workpieces, e.g. covers, forming these stacks. The workpiece stacks 1 in the conveyor trough 4 are moved in the direction of the arrow 6 from the counting and feed mechanism 2 to the unloading station E. The conveyor trough 4 extends in the feed direction beyond the counting and feed mechanism 2 and thus acts to transport the workpieces, e.g. lids or covers, which arrive in throughgoing column C at the counting and feed mechanism 2.

The workpiece counting and feed mechanism 2 is only illustrated schematically in the drawing and comprises a counting mechanism 2' and a feed mechanism 2''. The workpiece counting mechanism 2 is located primarily in the housing 2a.

The actual feed mechanism 2'' for the workpieces is located in the housing 2b and can comprise a push rod (not shown) moving back and forth with knives or fingers held on it, which moves the workpieces, e.g. covers, counted from the column C issuing from the counting mechanism 2a in the direction of the arrow 6 so that a gap 7 arises between this stack 1 advancing in the conveyor trough 4 from the feed mechanism 2 and the following workpieces in the column C, in which a spherical spacer 8 is inserted so that the gap 7 between the successive individual stacks 1 is maintained until they reach the unloading station E.

Figure 2:
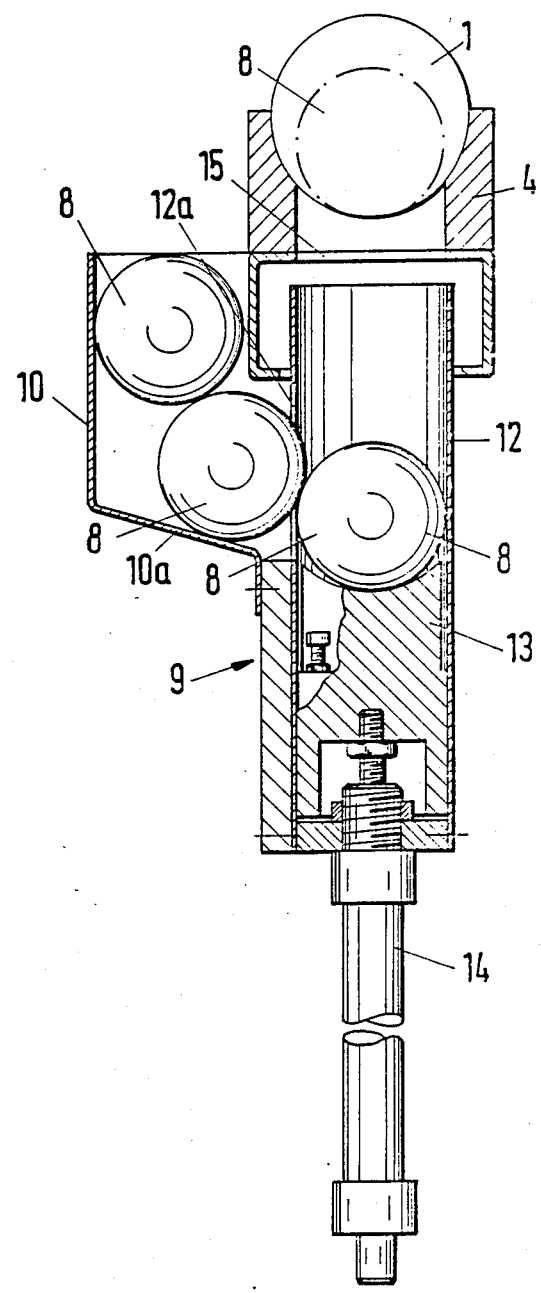
FIG. 2 is a detail transverse cross sectional view of the stacking machine of FIG. 1 at the position where the spherical spacers are fed into the conveyor trough.

In this embodiment a spacer inserting device 9, which is illustrated in FIG. 2, functions to insert the spherical spacer 8 in the gap 7 formed in the vicinity of the feed mechanism 2a.

The spherical spacers 8 located between the stacks 1 are moved along the conveyor trough 4 with the advancing stacks 1 by the force of the advancing stacks 1 until in the unloading station E and from there are fed back by a return trough 10 to the spacer inserting device 9.

The return trough 10 in this embodiment is supported laterally to the conveyor trough 4 and is inclined to the horizontal and the conveyor trough 4 so that because of the force of gravity the spherical spacers 8 arriving in the unloading station E in the return trough 10 roll in the return trough 10 to the spacer inserting device 9.

If it were not for that feature an energy-consuming drive mechanism to return the spherical spacers would be required.

In the simplest case the transfer of the spherical spacers 8 from the conveyor trough 4 in the vicinity of the unloading station E is effected because a suitable opening 11 is provided in the lateral wall of the conveyor trough 4 and the return trough 10 and in the vicinity of this opening 11 the trough bottom of the conveyor trough 4 is inclined toward the return trough 10 so that the spherical spacers 8 because of the inclined bottom surface of the conveyor trough 4 roll into the return trough 10 and then roll to the spacer inserting device 9.

The spacer inserting device 9 according to FIG. 2 has a feed shaft 12 located under the conveyor trough 4 perpendicular to the long axis of the conveyor trough 4.

The feed shaft 12 is connected with and open to the return trough 10 which in the vicinity of the spacer inserting device 9 has a dropping bottom section 10a running inclined toward the feed shaft 12. The spherical spacers 8 arriving at the spacer inserting device 9 through the return trough 10 because of the force of gravity drop into the interior of this shaft through the opening 12a because of the inclined bottom section 10a.

The feed shaft 12 receives or contains a displacing member 13 which is shaped like a piston which is part of a piston-cylinder unit 14. In operation of the piston-cylinder unit 14, the displacing member 13 is moved upwardly with a spherical spacer 8 on it so that the spherical spacer 8 arrives through a bottom opening 15 in the conveyor trough 4 in the gap 7 formed in the vicinity of the feed mechanism 2" between the stack of counted workpieces, e.g. covers, and the following workpieces. The displacing member 13 remains in this raised position until the spherical spacer 8 raised into this gap 7 travels outside the position of the bottom opening 15 of the conveyor trough where the spherical spacers enter the conveyor trough 4 and then it is moved back into the position illustrated in FIG. 2 to receive the next spacer 8.

The spacer displacing mechanism by definition includes the displacing member 13 and the rest of the piston-cylinder unit 14.

The control of the spacer displacing mechanism comprising the displacing member 13 and the piston-cylinder unit 14 by feed mechanism 2" is effected in such a way that immediately after the separation of the stack 1 issuing from the counting and feed mechanism 2 the next spherical spacer 8 is fed into the appropriate gap 7 above the spacer inserting device.

From FIG. 2 one sees that the spherical spacers 8 have a diameter which is reduced in comparison to that of the workpieces, e.g. the covers, of the stacks 1. Hence, the workpieces of the stacks 1 can be moved over the bottom opening 15 of the conveyor trough 4 while being supported on the trough 4. Thus they do not fall through the bottom opening 15.

Figure 3:
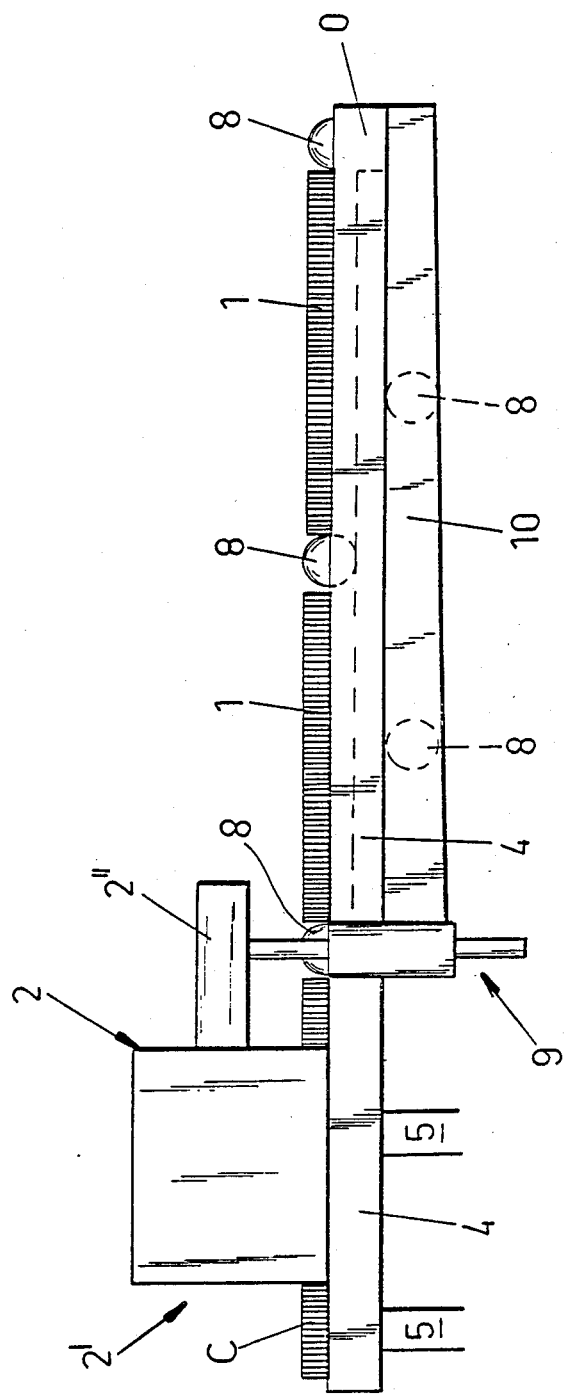
FIG. 3 is a side elevational view of another embodiment of the stacking machine according to our invention with the return trough immediately below the conveyor trough.

Instead of lateral attachment of the return trough 10 to the conveyor trough 4 in the embodiment of FIG. 1 the return trough 10 can also be located under the conveyor trough 4 as shown in FIG. 3. In this case the spherical spacers 8 in the unloading station E can fall through a bottom opening O of this trough into the return trough. In the vicinity of the spacer inserting device 9 the return trough 10 can open directly into the feed shaft 12 so that thus lateral feed of the spacers 8 is not required. The transfer of the spherical spacers 8 from the conveyor to the return trough can occur at any point in the unloading station E. Also it can occur at the beginning of the unloading station.

FIG. 4 shows an additional embodiment of the stacking machine in which the return trough 10 is above the conveyor trough 4 in the vicinity of the unloading station E. It is then inclined downwardly toward the conveyor trough 4. There must be a spacer displacing mechanism SD located at the unloading station E to raise the spherical spacers 8 to the return trough 10.

We claim:

1. In a stacking machine for making a stack of adjacent disk-like workpieces, especially metal covers, comprising a conveyor trough, on which said workpieces move in a column of said workpieces in the longitudinal direction of said column, a feed mechanism separating successive ones of said stacks to form a gap between each of said stacks and the following ones of said workpieces and an unloading station to which said stacks are fed prior to further processing, the improvement comprising a plurality of spherical spacers, each of which functions as a separating member between said successive stacks, a spacer inserting device for inserting each of said spherical spacers at a position on said conveyor trough where said gap between said successive stacks is produced by said feed mechanism and a return trough for said spherical spacers inclined to said conveyor trough extending to said position where said spherical spacers are fed back into said conveyor trough.

2. The improvement defined in claim 1 further comprising a spacer displacing mechanism for said spherical spacers arranged between said conveyor trough and an end of said return trough in the vicinity of said spacer inserting device.

3. The improvement defined in claim 2 wherein said return trough is laterally attached to said conveyor trough.

4. The improvement defined in claim 2 wherein said return trough is mounted below said conveyor trough.

5. The improvement defined in claim 1 wherein said return trough is laterally attached to said conveyor trough, said return trough and said conveyor trough being connected with each other and open to each other in the vicinity of said unloading station for said stacks, and said return trough runs inclined to said spacer inserting device for said spherical spacers and at an end of said return trough in the vicinity of said spacer inserting device said return trough is connected to a feed shaft for said spacers, which is located under a bottom opening of said conveyor trough and which receives a spacer displacing mechanism.

6. The improvement defined in claim 1 wherein said return trough for said spherical spacers is attached laterally to said conveyor trough and a spacer displacing mechanism for said spherical spacers is provided in the vicinity of said unloading station for said stacks for raising said spacers to said return trough which is higher than said conveyor trough in the vicinity of said unloading station and said return trough is connected with and open to said conveyor trough in the vicinity of said position where said spacers are fed into said conveyor trough so that said stacks of said workpieces function as a stop for said spherical spacers until said gap between said stacks appears at said position where said spherical spacers are fed between said successive stacks.

7. The improvement defined in claim 6 wherein said spacer displacing mechanism further comprises a piston-cylinder unit.

8. The improvement defined in claim 7 wherein said spacer displacing mechanism is controllable by said feed mechanism.

9. A stacking machine for making a stack of adjacent disk-like workpieces, especially metal covers, comprising:
   a conveyor trough, on which said workpieces move in a column of said workpieces in the longitudinal direction of said column;
   a feed mechanism separating successive ones of said stacks to form a gap between each of said stacks and the following ones of said workpieces;
   a plurality of spherical spacers functioning as separating members between said successive stacks which are inserted at a position on said conveyor trough where said gap is formed by said feed mechanism;
   an unloading station to which said stacks are fed prior to further processing;
   a return trough for said spherical spacers inclined to said conveyor trough extending to said position where said spherical spacers are fed back into said conveyor trough, said return trough and said conveyor trough being connected with each other and open to each other in the vicinity of said unloading station for said stacks; and
   a spacer inserting device for inserting of each of said spherical spacers in said gap between said successive stacks produced by said feed mechanism in the vicinity of said feed mechanism, said return trough running inclined to said spacer inserting device for said spherical spacers and at an end of said return trough in the vicinity of said spacer inserting device said return trough being connected to a feed shaft for said spacers which is located under a bottom opening of said conveyor trough and which receives a spacer displacing mechanism for said spherical spacers arranged between said conveyor trough and said end of said return trough in the vicinity of said spacer inserting device.

10. A stacking machine according to claim 9 wherein said return trough is laterally attached to said conveyor trough.

11. A stacking machine according to claim 9 wherein said return trough is mounted below said conveyor trough.

12. A stacking machine for making a stack of adjacent disk-like workpieces, especially metal covers, comprising:
- a conveyor trough, on which said workpieces move in a column of said workpieces in the longitudinal direction of said column;
- a feed mechanism separating successive ones of said stacks to form a gap between each of said stacks and the following ones of said workpieces;
- a plurality of spherical spacers functioning as separating members between said successive stacks which are inserted at a position on said conveyor trough where said gap is formed by said feed mechanism;
- an unloading station to which said stacks are fed prior to further processing;
- a return trough for said spherical spacers which is higher than said conveyor trough and is connected to said conveyor trough in the vicinity of said unloading station, is inclined to said conveyor trough and extends to said position where said spherical spacers are fed back into said conveyor trough; and
- a spacer displacing mechanism for said spherical spacers in the vicinity of said unloading station, said return trough being open to said conveyor trough in the vicinity of said position where said spherical spacers are inserted between said stacks so that said stacks of said workpieces function as a stop for said spherical spacers.

* * * * *